J. CAIRNS.
TIRE FOR VEHICLE WHEELS.
APPLICATION FILED MAY 23, 1910.
1,143,102.
Patented June 15, 1915.
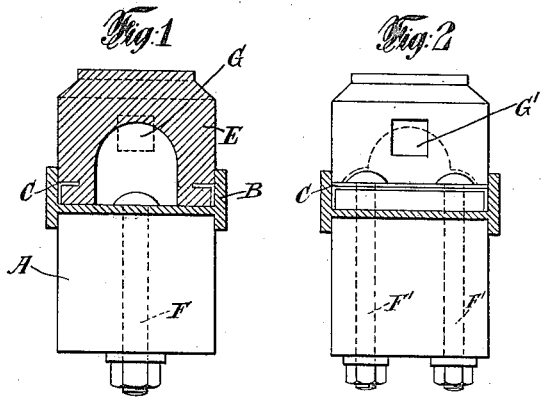
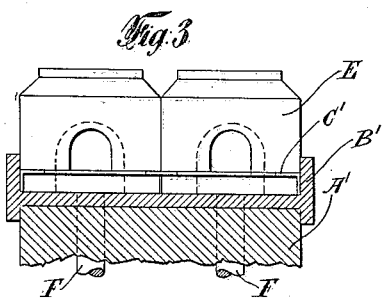
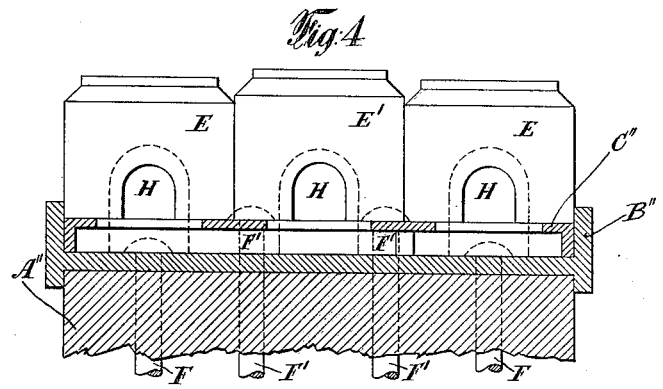
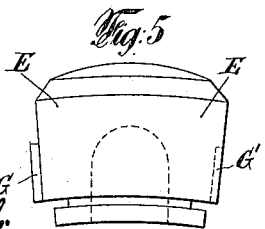
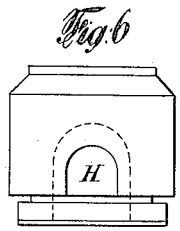
Witnesses:
M. Morse
A. F. McLaughlin
Inventor
John Cairns
By his Attorneys
Prindle & Wright

UNITED STATES PATENT OFFICE.

JOHN CAIRNS, OF WILLENHALL, SOUTH STAFFS, ENGLAND.

TIRE FOR VEHICLE-WHEELS.

1,143,102.  Specification of Letters Patent.  Patented June 15, 1915.

Application filed May 23, 1910. Serial No. 562,889.

*To all whom it may concern:*

Be it known that I, JOHN CAIRNS, of Burnaby Terrace, Walsall Road, Willenhall, South Staffs, England, mechanic, have invented certain new and useful Tires for Vehicle-Wheels, of which the following is a specification.

This invention relates to that class of tire for wheels of vehicles in which the elastic studs can be taken out and replaced in a few seconds without taking off the rim of the wheel proper when renewing or repairing.

According to my invention I now propose to have a metal band with an inward flange on each side and recesses cut in order to retain an elastic stud. These studs are made of rubber or any other suitable elastic material having an oblong or spheroidal hollow recess on their inner side to contain air when placed in the metal band, the outward portion of the rubber to be made oblong to fit over the outside of the metal band and to be made male and female, that is to say, with alternate projection and recess formed in the direction of the run of the wheel in order to interlock the studs together and to prevent them from coming out in case of a side slip.

For heavy wood wheels I purpose having a double flanged metal rim of H shape, one portion of the band is designed to lock the felly of the wheel, and the other portion to retain the inwardly flanged metal band suitably attached to the wheel with bolts, ready to take elastic studs, these studs to be fitted in position from the top side. This double flanged metal rim of H-shape can be made with recesses cut therein to retain elastic studs without the aid of an inwardly flanged band.

In the case of a metal wheel I use the top portion of the wheel as a metal band and would cut recesses in it to retain elastic studs without the aid of bolts, rivets, or the like.

In order that my invention may be properly understood and readily carried into effect, I have hereunto appended seven sheets of drawings, of which—

Figures 1 and 2 are cross sections, respectively, showing a double flanged metal rim and inward flanged metal band bolted to wooden felly with stud attached. Fig. 3 is a cross section of a double row of studs of a motor car or other vehicle showing double flanged metal rim and inner band of a back wheel. Fig. 4 is a cross section of a heavy vehicle back wheel with a triple row of studs showing double flanged metal rim and inner band with bolts in position through wooden felly. Fig. 5 is a side elevation of a complete elastic stud showing it made male and female with a canvas on its underside; and Fig. 6 is an end view of the same.

As shown in the drawings, reference being had to Figs. 1 and 2, I have provided a wheel rim A on the outer periphery of which there is located an annular plate B having a cross-section shaped like the letter H, and fitting over the outer periphery of the wheel rim A in such a manner that two of the flanges of the plate B extend downwardly over the edge of the said rim. The plate B is adapted to be held in place by means of bolts F. Within the groove formed upon the outer face of the plate B I have provided a metal band C having inwardly directed flanges to rest against the base of the plate B and having a plurality of circular openings to receive hollow studs E. Each of the studs E has at one side a recess G' and at the other side a projection G so that the adjacent projections and recesses in the hollow studs E will register with one another, to interlock the various studs together. The metal band C and its attached studs E are held in place by a plurality of bolts F.

In the modification of my invention shown in Fig. 3, the construction is the same as the construction already described in the form of my invention shown in Figs. 1 and 2, except that in this modification of my invention a heavier rim A' is provided for supporting heavier loads, and is therefore made broader, while the attached parts are also made broader and of sufficient width to support two rows of studs E placed side by side but in staggered position. In this instance, there is provided a wider plate B' in the shape of the letter H, which is clamped in place by the bolts F, and which is designed to receive a metal band C' having openings properly placed to receive rubber studs E.

In the modification of my invention shown in Fig. 4, the construction is the same as in Fig. 3, except that in this form of my invention a rim A'' is provided of extra width for sustaining very heavy loads, while the same is provided with a plate B'' in the shape of the letter H which receives a metal band C'' provided with three rows of openings to receive three rows of studs E, which are staggered in the same manner as referred to in connection with Fig. 3. In this form of my invention a series of central studs E' may be provided which are slightly more elevated than the two outside lines of studs E.

The construction of a particular stud is shown in Figs. 5 and 6 in which each of the studs E is shown to have a central cavity or opening H, while one end of the stud is provided as already described with a projection G, while the other end of the stud has a recess G'.

It will be obvious from the foregoing description, that all of the forms of the invention present the common novel features of hollow resilient studs having their open base portions closed by the wall of the annular recess formed in the felly of the wheel, or attached thereto, so that upon compression under a load, the air retained in the hollow studs will resist deformation. It will be seen that all of the studs engage the lateral side flanges of the felly and also engage the outer face of the inverted holding bands through the openings of which the reduced base portions of the studs project. The studs are all provided with annular recesses fitting the inner walls of the openings and with reduced base portions engaging, not only the inner face of the band, but also the lower wall of the annular recess of the wheel. By reference to any of the sectional views it will be seen that upon compression of the studs, the lower open ends will be forced against the inner wall of the wheel recess so as to close such open base portions and therefore retain the air to cushion and support the studs against reformation. The interfitting parts of the studs, male and female, serve as an additional holding means therefor.

While I have described my invention above in detail, I wish it to be understood that many changes may be made therein without departing from the spirit of my invention.

Claim:

In combination with a wheel having peripheral side flanges forming an annular peripheral recess, an inwardly flanged inverted band in said recess between said side flanges and provided with a plurality of stud receiving openings, and hollow resilient studs open at their bases and having body portions engaging said side flanges and seated on the outer faces of said band, said studs having recessed portions engaging the inner edges of the openings in said band and reduced base portions engaging the inner face of said band and seated on the wall of said recess with the lower open portions of the bases closed by said recess wall, whereby compression of the stud serves to close the same against discharge of air to resist deformation.

In testimony whereof I affix my signature in presence of two witnesses.

JOHN CAIRNS.

Witnesses:
ETHEL M. WEBB,
KATHLEEN M. THOMPSON.

Copies of this patent may be obtained for five cents each, by addressing the "Commissioner of Patents, Washington, D. C."